J. G. & G. B. SPEAR.
PUMP.
APPLICATION FILED JULY 16, 1917.
1,266,876.
Patented May 21, 1918.
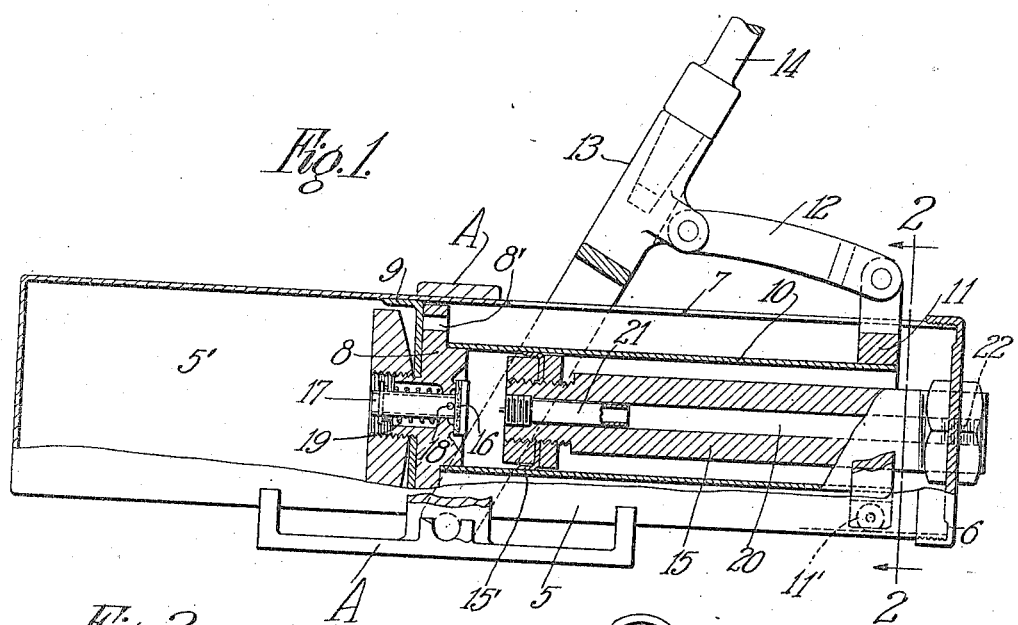
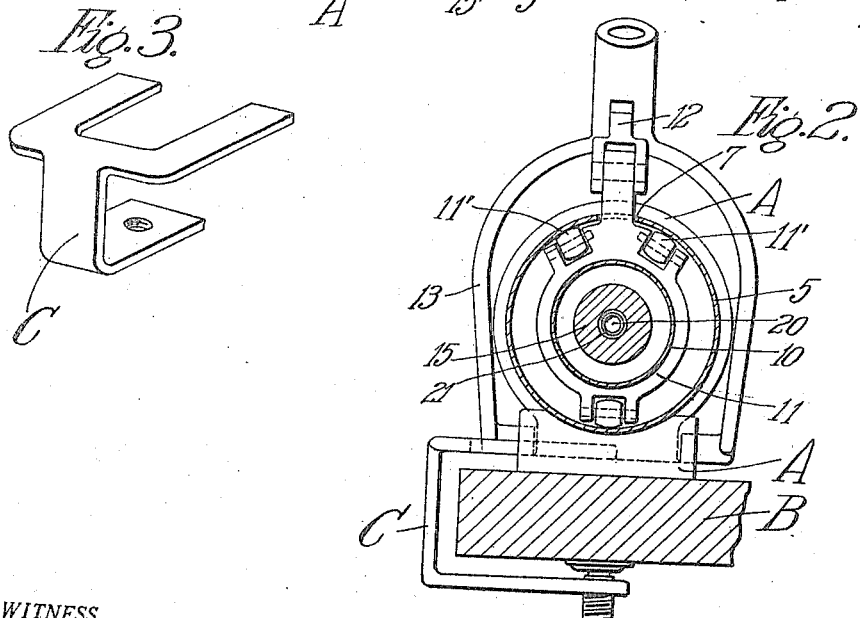
WITNESS
W. C. Ron.
INVENTORS.
John G. Spear and
BY Graham B. Spear:
Chapin + Neal.
ATTORNEYS.

UNITED STATES PATENT OFFICE.

JOHN G. SPEAR AND GRAHAM B. SPEAR, OF SPRINGFIELD, MASSACHUSETTS.

PUMP.

1,266,876.　　　　　Specification of Letters Patent.　　Patented May 21, 1918.

Application filed July 16, 1917.　Serial No. 180,783.

*To all whom it may concern:*

Be it known that we, JOHN G. SPEAR and GRAHAM B. SPEAR, citizens of the United States of America, residing at Springfield, in the county of Hampden and State of Massachusetts, have invented certain new and useful Improvements in Pumps, of which the following is a specification.

This invention relates to pumps and more particularly to improvements in compound pumps. While the invention is capable of general application, it finds one advantageous specific use as an air compression pump for use in the inflation of pneumatic tires and the like.

The invention has for one object to provide a pump of the class described which is capable of being conveniently attached to the running board or other suitable part of an automobile and which embodies an improved arrangement of parts particularly advantageous for such use, together with means whereby the pump may be operated manually for the purpose of inflating the tires more readily than is possible with ordinary manually operated pumps.

Another object of the invention is to provide a compound pump embodying an improved arrangement of parts, whereby the high pressure cylinder and low pressure piston are interconnected and reciprocable entirely within and inclosed in a cylindrical casing, a part of which forms the low pressure cylinder.

Another object of the invention is to provide in a pump of the class described, a combined high pressure cylinder and low pressure piston, the latter supporting the former at one end from the low pressure cylinder, a lever connected intermediate its ends to the high pressure cylinder at a distance from the axis of the latter, and a supporting member on the other end of the high pressure cylinder having a rolling engagement with suitable guides, the construction being characterized in that a leverage is obtained to move the combined cylinder and piston by a lever arranged for convenient operation and in that lateral displacement of the cylinder from lateral stresses exerted thereon by the lever is prevented by antifriction guiding means.

Other objects and advantages will appear in the following description and in the appended claims.

The invention, in an embodiment at present preferred, is shown for illustrative purposes in the accompanying drawings, in which—

Figure 1 is a sectional elevational view of a pump embodying the invention;

Fig. 2 is a cross sectional view taken on the line 2—2 of Fig. 1; and

Fig. 3 is a perspective view of a holding clamp for the pump.

Referring to these drawings, A represents a bracket which may be suitably held to any suitable support as, for example, to the running board B of an automobile or other vehicle. Bracket A may be conveniently held to board B by a clamping plate C and a clamping screw S in a manner clearly obvious from Fig. 2. The plate C itself is clearly shown in Fig. 3. Obviously, bracket A may be otherwise supported, if desired, but the described supporting means is best suited for the present adaptation of the invention as an air compressing pump for use in the inflation of pneumatic tires. The invention is capable of other applications and the adaptation described is chosen for the purposes of illustration.

Fixed intermediate its ends to bracket A is a cylindrical casing 5, one end of which is permanently closed and the other end of which is closed by a removable cap 6. The end of casing 5 adjacent the latter is, however, constantly in communication with the atmosphere by reason of a slot 7, which is formed in the upper peripheral portion of the cylinder and extends longitudinally of the latter from cap 6 to bracket A. That portion to the left of the latter constitutes a cylinder 5′ and slidable therein is a piston 8 which has one or more holes 8′ therein and a suitable cupped washer 9, of leather or the like, which normally covers hole 8′ as shown. The piston 8 is fixed to one end of a sleeve 10, and the other end of the latter is supported by a spider 11 and a plurality of rolls 11′ which, as shown in Fig. 2, roll on the inner surface of casing 5 as guides. The spider 11 has a part extending through slot 7 and a link 12 connects this part with a lever 13 which is forked to encompass casing 5 and is fulcrumed on bracket A as indicated in Figs. 1 and 2. Lever 13 has a handle portion 14 which is preferably removably mounted thereon by the plug and socket connection shown.

Fixed to the described cap 6 and extending in spaced concentrical relation within cylinder 10 is a piston rod carrying a piston 15′ to engage the inner peripheral walls of the cylinder 10. One end of the latter communicates at all times with the corresponding end of casing 5 and thus with the atmosphere. The other end of cylinder 10 may communicate with the corresponding end of cylinder 5′ during the compression stroke of piston 8 by means of a valve 16. The latter has a slidable hollow stem 17, which has recesses 18 in its periphery closely adjacent valve 16. The latter is normally held to its seat by a spring 19. The same end of cylinder 10 may communicate with cylinder 5′ by valve 16 and may also communicate with a passage 20 formed in the piston rod 15. This latter communication is controlled by a valve 21. The latter has not been illustrated in detail but may be considered for illustrative purposes as the equivalent of the ordinary and well known tire valve. The passage 20 is provided with a threaded portion 22 at its outlet end to permit attachment to a hose, pipe, or other suitable connection.

The operation of the pump will next be described. The cylinders 5′ and 10 constitute low and high pressure cylinders, respectively, of a compound pump. The low pressure cylinder and high pressure piston are connected together as are also the high pressure cylinder and low pressure piston. The cylinders are movable, the one relatively to the other by reciprocating the lever 13, a part of spider 11 sliding in slot 7 for guiding purposes. It is preferable, however, in the present adaptation of the invention, that the casing 5 be held fast since it functions in part as a low pressure cylinder and in part as a casing to contain, conceal, and guide the other cylinder and the pistons.

Assuming that cylinder 10 and piston 8 are in their extreme left hand positions and are about to be moved into the illustrated position. This movement will create a partial vacuum in the left hand portion of cylinder 5′ for valve 16 is held in closed position by the force of spring 17. The other part of cylinder 5′ communicates with the atmosphere, and the atmospheric pressure forces the member 9 to the left and permits air to enter to the left of piston 8. As the latter moves into the illustrated position, cylinder 5′ is filled with air at atmospheric pressure. As piston 8 moves to the left, member 9 seats and is held seated to close hole 8′ by the pressure of air in cylinder 5′, and this air is compressed to a degree sufficient to open valve 16 against the force of spring 19. The air then passes through tube 17 and emerges through the apertures 18 into the cylinder 10. As the piston 8 reaches its extreme left hand position, cylinder 10 has been moved away from its piston 15′ and lies substantially entirely within cylinder 5′. Cylinder 10, to the left of piston 15′, is filled with air which has been compressed from the displacement volume of cylinder 5′ into the displacement volume of cylinder 10. As piston 8 again moves to the right to draw in another volume of air, cylinder 10 moves therewith and compresses the air therein against the stationary piston 15′ to a degree sufficient to open valve 21, whereby the air compressed in successive stages emerges through the passage 20 in the piston rod 15.

The pump described is particularly advantageous for use in the inflation of pneumatic tires. It is capable of being readily and conveniently attached to the running board of an automobile, for example, and, when thus attached, can be operated more conveniently and less laboriously than pumps of the prior art. When not in use, the pump may be quickly removed and by removing the handle 14, the latter and the pump will easily fit within the tool box of the automobile. A feature of particular importance is the arrangement, whereby the low pressure cylinder extends farther than is necessary for its usual function and incloses the high pressure cylinder, whereby the pump is made of neat appearance suitable for the adaptation of the invention described. As distinguished from "telescopic" pumps, one cylinder reciprocates entirely within another, and, aside from the concealment of the one cylinder, the arrangement is advantageous in that both ends of one cylinder may be guided within the other. The importance of guiding the movable cylinder is particularly desirable where, as here, it is desired, on account of convenient actuation, to have the lever connected to the cylinder at a distance from the axis of the cylinder, as there is a force tending to move the cylinder laterally out of its proper axial line of movement.

The invention has been described in one embodiment for illustrative purposes, but the scope of the invention is defined by the appended claims rather than by the foregoing description.

What we claim is—

1. A compound pump, comprising, a stationary low pressure cylinder, a high pressure cylinder therein, a low pressure piston on the latter to support one end thereof, a stationary high pressure piston, stationary guiding means adjacent the latter, means on the other end of the high pressure cylinder having a rolling engagement with said guiding means, and a pivoted lever connected intermediate its ends to said high pressure cylinder at a point offset from its axis and arranged to reciprocate said high pressure cylinder and low pressure piston.

2. A compound pump, comprising, a stationary low pressure cylinder, a high pressure cylinder therein, a low pressure piston on the latter to support one end thereof, a stationary high pressure piston, stationary guiding means adjacent the latter, means on the other end of the high pressure cylinder having a rolling engagement with said guiding means, and means connected to the high pressure cylinder at a point offset from its axis to reciprocate said high pressure cylinder and low pressure piston.

3. A pump, comprising, a cylindrical casing having a closed end, means to support the casing intermediate its ends, a piston reciprocable in the casing between said end and a point intermediate its ends, a cylinder fixed at one end to the piston and movable therewith in spaced concentrical relation within said casing, means to support the other end of said cylinder with a rolling engagement with the interior walls thereof, a hollow piston rod fixed to the other end of the casing, and extending into said cylinder, a piston on said rod, means to admit fluid between said end and movable piston, means to permit fluid compressed by the latter to enter said cylinder between the pistons, and a valve controlling the communication between said cylinder and hollow piston rod to permit fluid compressed in the former to enter the latter, a slot in said casing, a part on said cylinder supporting means to ride in said slot to guide the cylinder, and a lever pivoted to said supporting means and connected intermediate its ends to reciprocate said part, said casing being characterized in that it serves as a low pressure cylinder and a casing to contain and conceal the high pressure cylinder.

4. A compound pump, comprising, a casing substantially half of which constitutes a low pressure cylinder, a piston for the latter, a high pressure cylinder fixed at one end to the piston, a stationary piston in the high pressure cylinder, means to admit fluid to the low pressure cylinder, means to admit fluid compressed in the latter to the high pressure cylinder, a valve controlled outlet through the latter opening to the exterior of the casing, through which outlet the fluid compressed in the high pressure cylinder may be delivered, a spider to support the other end of the high pressure cylinder and having a rolling engagement with said casing, a slot in said casing through which a part of said spider protrudes, and a lever pivoted to the casing intermediate the ends thereof and connected to reciprocate said part, all constructed and arranged to provide a compound pump wherein the high pressure cylinder may be entirely inclosed within the low pressure cylinder.

5. A compound pump, comprising, a single stationary cylinder with closed ends, within which are concealed for operation, a piston coöperating with the cylinder as a low pressure pump, a pump cylinder fixed to the piston for operation as a piston rod, a stationary piston and a rod which is hollow and fixed to one end of the stationary cylinder to serve as the compound pump outlet and to coöperate with the pump cylinder as a high pressure pump, guiding and supporting means attached to the end of the pump cylinder and constructed to roll upon the interior of the stationary cylinder and power multiplying means outside of the stationary cylinder connected through a slot in the latter to the guiding and supporting means to operate the pump mechanism in the stationary cylinder from without, all constructed and arranged so that the one stationary cylinder may serve as a pump, a casing, a centering means, and a guide for the whole and the power multiplying device may be located where desired.

JOHN G. SPEAR.
GRAHAM B. SPEAR.

Copies of this patent may be obtained for five cents each, by addressing the "Commissioner of Patents, Washington, D. C."